Patented Nov. 3, 1936

2,059,526

UNITED STATES PATENT OFFICE 2,059,526

PRODUCTION OF MOLDING RESINS

Kenneth M. Irey, Ridgefield Park, N. J., and Lloyd C. Swallen, Terre Haute, Ind., assignors to Resinox Corporation, New York, N. Y., a corporation of Delaware No Drawing. Application July 13, 1933, Serial No. 680,230

9 Claims. (Cl. 260—4)

Our present invention relates to improvements in and relating to the manufacture of molding resins, and has particular reference to the manufacture of this type of resin from phenolic bodies, ketones and aldehydes, and more particularly, from phenol, acetone and formaldehyde.

In a co-pending application Serial No. 571,863, by K. M. Irey, for "Oil-soluble resins", filed October 29, 1931, now matured into U. S. Patent 1,948,469, there has been described a method of making oil-soluble resins by first reacting a phenol and a ketone in such a manner as to give a mixture of a bis-[4-hydroxy-aryl]-dialkyl methane and a bis-[4-hydroxy-aryl]-dialkyl methane—ketone condensation product in approximately equal proportions. After removal of the catalyst and excess phenol, this intermediate material is next reacted under suitable conditions with less than 0.5, and preferably with from 0.25 to 0.35 mol. of an aldehyde per mol. of phenol reacted in producing the said mixed intermediate so as to give a resinous body which is soluble in oil and having in general the various properties necessary for the production of an oil varnish.

We have now made the discovery that by suitably modifying the proportions of the reactants and the operating conditions a resin may be obtained possessing characteristics which made it highly suitable for the production of many varieties of molded articles for which previously known types of resins may not be conveniently employed. The method of producing our new molding resin may be illustrated by the following specific examples.

The first step in the operation involves the preparation of a mixture of bis-[hydroxy-aryl]-dialkyl methane and bis-[hydroxy-aryl]-dialkyl methane—ketone condensation product, such as, for example, a mixture of bis-[4-hydroxy-aryl]-dialkyl methane and bis-[4-hydroxy-aryl]-dialkyl methane—ketone condensation product. These materials may be prepared separately and mixed in suitable proportions. Preferably, however, a suitable mixture of the two compounds is obtained in a single operation of the following character: Two and one-half mols phenol are melted and mixed with one mol. of acetone in a reaction vessel provided with coils or other suitable means for heating or cooling the contents thereof. From 5 to 6% of hydrochloric acid (32%), based on the weight of the phenol, is next added to the reaction mixture and the latter then suitably cooled or heated so that a reaction temperature of approximately 80–82° C. is attained over a period of about 70 hours time After the completion of the reaction the hydrochloric acid catalyst is removed by neutralizing with an aqueous solution of an alkali, such as lime water and the resulting salt water layer removed from the reaction mixture which is subjected to steam distillation in order to recover unreacted phenol, approximately 30% of the original phenol being recovered at this point. The resulting reaction mixture is composed of a mixture of approximately 55–65% beta.beta-bis-[hydroxy - phenyl] - propane and approximately 45–35% beta.beta-bis-[hydroxy-phenyl]-propane—acetone condensation product. The 4-hydroxy-phenyl type compound appears to be chiefly formed.

When crude phenol, composed of say 90% phenol and 10% cresols is used as the reactant in place of pure phenol, a mixture of the corresponding hydroxy-aryl and 4-hydroxy-aryl type compounds are obtained. For commercial scale operations, the use of crude phenol naturally has certain advantages.

Beta.beta-bis-[4-hydroxy-phenyl]-propane is a white crystalline material with a melting point of 150–154° C. Beta.beta-bis[4-hydroxy-phenyl]-propane—acetone condensation product is a reddish colored material having a melting point around 50° C.

The reaction described above may be regulated so as to vary the relative proportions of beta.beta-bis-[4-hydroxy-phenyl]-propane and beta.beta-bis-[4-hydroxy-phenyl]-propane—acetone condensation product in the reaction product. The proportion of the latter in the reaction product may generally be increased by using a higher reaction temperature and a longer time of reaction.

If desired, the above mentioned materials may be prepared separately and then mixed in approximately equal proportions to give the intermediate necessary for the production of our new molding resin. Beta.beta-bis-[4-hydroxy-phenyl]-propane and its homologues may be prepared, for example, by the method described by W. A. Beatty in U. S. Patent No. 1,225,748, granted March 15, 1917.

Beta.beta-bis-[4-hydroxy - phenyl]- propane—acetone condensation product and its homologues may be prepared, for example, by reacting equimolecular proportions of phenol and acetone in the presence of hydrochloric acid as a catalyst and at a temperature of 70–80° C. for a period of about 48 hours or at room temperature for several days, the unreacted phenol and catalyst being removed at the end of the operation and the operation in general being carried out as hereinabove described.

According to a second procedure, beta.beta-bis-[4-hydroxy-phenyl]-propane may first be prepared and then reacted with an equi-molecular proportion of acetone in the presence of hydrochloric acid as a catalyst.

The second step in the production of our new molding resin involves the reaction of the "intermediate", consisting of approximately equal amounts of beta.beta-bis-[hydroxy-phenyl]-propane and beta.beta-bis-[hydroxy-phenyl]-propane—acetone condensation product such as, for example, beta.beta-bis-[4-hydroxy-phenyl]-propane and beta.beta-bis-[4-hydroxy-phenyl]-propane—acetone condensation product, prepared by any convenient method, with a suitable amount of formaldehyde in the presence of a catalyst. One mol. of "intermediate" is placed in the reaction vessel, melted, cooled to a temperature of approximately 85–90° C., and approximately 1.075 mols of formaldehyde per mol. of residual phenol in said intermediate in the form of an aqueous 40% solution are added. The resulting mixture is then subjected to additional cooling, if necessary to attain a temperature of approximately 50° C. An aqueous solution of approximately 0.016 mol. of barium hydroxide is then added to the reaction mixture to serve as a catalyst. The heat generated by the reaction is generally sufficient to complete the reaction and ordinarily it is advisable to cool the mixture during the early stage of the reaction in order to prevent the temperature from rising too high. The temperature is preferably maintained within the range 50° to 85° C. until a sample removed from the reaction vessel for testing is converted to a dry rubber-like state when heated on a hot plate at 150° C. for 75–80 seconds.

When the reaction has progressed to the desired point the reaction mixture is dehydrated under vacuo, the temperature still being maintained below 85° C. and preferably below 75° C. Since the final resin has a high melting point, it is desirable to raise the temperature of the resin rapidly near the end of the operation in order to get as much of the excess water as possible off. This may be accomplished by decreasing the vacuum. Near the end of the operation the temperature, vacuum, and time of heating should be carefully watched in order to remove as much water as possible and at the same time prevent excessive polymerization. The finished resin may be handled in the customary manner.

The synthetic resin obtained by the procedure just described is very light in color, enabling it to be used for purposes for which other synthetic resins may not be satisfactorily employed on account of their darker color. Of equal, if not greater, importance is the fact that our new resin does not turn yellow or darken on exposure to light, as is the case with other synthetic resins which are originally light in color. This property enables our new resin to be used in the production of plastics of many and delicate shades of colors. It is particularly better suited for such purposes than the ordinary phenol-formaldehyde and formaldehyde-urea synthetic resins. Further advantages in our new resin are its low degree of hygroscopicity and high strength, its strength being approximately 20% higher than that of the usual grades of phenol-formaldehyde resins. Rapid and satisfactory cures also may be obtained without the aid of hardening agents such as hexamethylene tetramine.

It is understood, of course, that our invention is not limited to the exact procedure of the specific example cited above but that the usual variations and equivalents which would occur to one skilled in the art may be employed. For example, other compounds having characteristics similar to acetone, phenol, formaldehyde and barium hydroxide will readily suggest themselves as equivalents of these substances. Examples of other such ketones are: methyl ethyl ketone, methyl propyl ketone, diethyl ketone. Other aldehydes which may be regarded as equivalents of formaldehyde are: acetaldehyde, butyraldehyde, propionaldehyde, etc. The cresols are examples of other phenolic bodies similar to phenol. For the barium hydroxide used as catalyst we may substitute other alkaline earth hydroxides such as calcium hydroxide or less desirably sodium hydroxide as other alkaline material or acidic materials such as sulphuric or oxalic acids. It is understood also that although the hydroxy-phenyl and 4-hydroxy-phenyl type compounds have been referred to specifically in the example, we may employ with satisfactory results the corresponding hydroxy-aryl and 4-hydroxy-aryl type compounds.

The proportions of the reactants also may be varied within certain limits without materially affecting the character of the final product. For example, while approximately 0.60 mol. of aldehyde per mol. of phenol reacted in preparing the phenol-ketone condensation product appears to be the least amount of aldehyde which may be used to give a satisfactory product, this amount may be very materially increased. 1.075 mols of aldehyde per mol. of phenol gives a product of highly desirable character. Aldehyde to the extent of even 2.0 or more mols per mol. of residual phenol may be employed but in general such amounts are entirely unnecessary and will be largely unreacted or lost.

The proportions of bis-[hydroxy-aryl]-dialkyl methane to bis-[hydroxy-aryl]-dialkyl methane—ketone condensation product may also be varied over rather wide limits. We prefer, however, to use an intermediate containing approximately 60% of the former to 40% of the latter.

Now having described our invention, what we claim is:

1. In a process of producing a quick curing infusible molding resin, the step which comprises reacting a mixture comprising essentially, as major components, bis-[hydroxy-aryl]-dialkyl methane and bis-[hydroxy-aryl]-dialkyl methane—ketone condensation product with in excess of 0.6 mol. of an aldehyde per mol. of phenolic body reacted in producing said mixture of bis-[hydroxy-aryl]-dialkyl methane and bis-[hydroxy-aryl]-dialkyl methane—ketone condensation product.

2. In a process of producing a quick curing infusible molding resin, the step which comprises reacting a mixture comprising essentially, as major components, bis-[4-hydroxy-aryl]-dialkyl methane and bis-[4-hydroxy-aryl]-dialkyl methane—ketone condensation product in the presence of an alkali catalyst, with in excess of 0.60 mol. of an aldehyde per mol. of phenolic body reacted in producing said mixture of bis-[4-hydroxy-aryl]-dialkyl methane and bis-[4-hydroxy-aryl]-dialkyl methane—ketone condensation product.

3. In a process of producing a quick curing infusible molding resin, the step which comprises reacting a mixture comprising essentially, as major components, beta.beta-bis-[4-hydroxyphenyl]-propane and beta.beta-bis-[4-hydroxy-phenyl]-propane—acetone condensation product with in excess of 0.60 mol. of formaldehyde per mol. of phenol reacted in producing said mixture of beta.beta-bis-[4-hydroxy-phenyl]-propane and beta.beta-bis-[4-hydroxy-phenyl]-propane—acetone condensation product.

4. In a process of producing a quick curing infusible molding resin, the step which comprises reacting a mixture comprising essentially, as major components, beta.beta-bis-[4-hydroxy-phenyl]-propane and beta.beta-bis-[4-hydroxy-phenyl]-propane—acetone condensation product in the presence of an alkaline earth hydroxide with in excess of 0.60 mol. of formaldehyde per mol. of phenol reacted in producing said mixture of beta.beta-bis-[4-hydroxy-phenyl]-propane and beta.beta-bis-[4-hydroxy-phenyl]-propane—acetone condensation product.

5. In a process of producing a quick curing infusible molding resin, the step which comprises reacting a mixture comprising essentially, as major components, beta.beta-bis-[4-hydroxy-phenyl]-propane and beta.beta-bis-[4-hydroxy-phenyl]-propane—acetone condensation product with approximately 1.075 mols of formaldehyde per mol. of phenol reacted in producing said mixture of beta.beta-bis-[4-hydroxy-phenyl]-propane and beta.beta-bis-[4-hydroxy-phenyl]-propane—acetone condensation product, said reaction being effected at a temperature not in excess of 100° C.

6. A quick curing infusible molding resin comprising the reaction product of a mixture comprising essentially, as major components, bis-[hydroxy-aryl]-dialkyl methane and bis-[hydroxy-aryl]-dialkyl methane—ketone condensation product with in excess of 0.6 mol. of an aldehyde per mol. of phenolic body reacted in producing said mixture of bis-[hydroxy-aryl]-dialkyl methane and bis-[hydroxy-aryl]-dialkyl methane—ketone condensation product.

7. A quick curing infusible molding resin comprising the reaction product of a mixture comprising essentially, as major components, bis-[4-hydroxy-aryl]-dialkyl methane and bis-[4-hydroxy-aryl]-diakyl methane—ketone condensation product with in excess of 0.6 mol. of an aldehyde per mol. of phenolic body reacted in producing said mixture of bis-[4-hydroxy-aryl]-dialkyl methane and bis-[4-hydroxy-aryl]-dialkyl methane—ketone condensation product.

8. A quick curing infusible molding resin comprising the reaction product of a mixture comprising essentially, as major components, beta.-beta-bis-[4-hydroxy-aryl]-propane and beta.-beta-bis-[4-hydroxy-aryl]-propane—acetone condensation product with in excess of 0.6 mol. of formaldehyde per mol. of phenolic body reacted in producing said mixture of beta.beta-bis-[4-hydroxy-aryl]-propane and beta.beta-bis-[4-hydroxy-aryl]-propane—acetone condensation product.

9. A quick curing infusible molding resin comprising the reaction product of a mixture comprising essentially, as major components, beta.-beta-bis-[hydroxy-aryl]-propane and beta.beta-bis-[hydroxy-aryl]-propane—acetone condensation product with approximately 1.075 mols of formaldehyde per mol. of phenolic body reacted in producing said mixture of beta.beta-bis-[hydroxy-aryl]-propane and beta.beta-bis-[hydroxy-aryl]-propane—acetone condensation product.

KENNETH M. IREY.
LLOYD C. SWALLEN.